United States Patent Office 2,895,559
Patented July 21, 1959

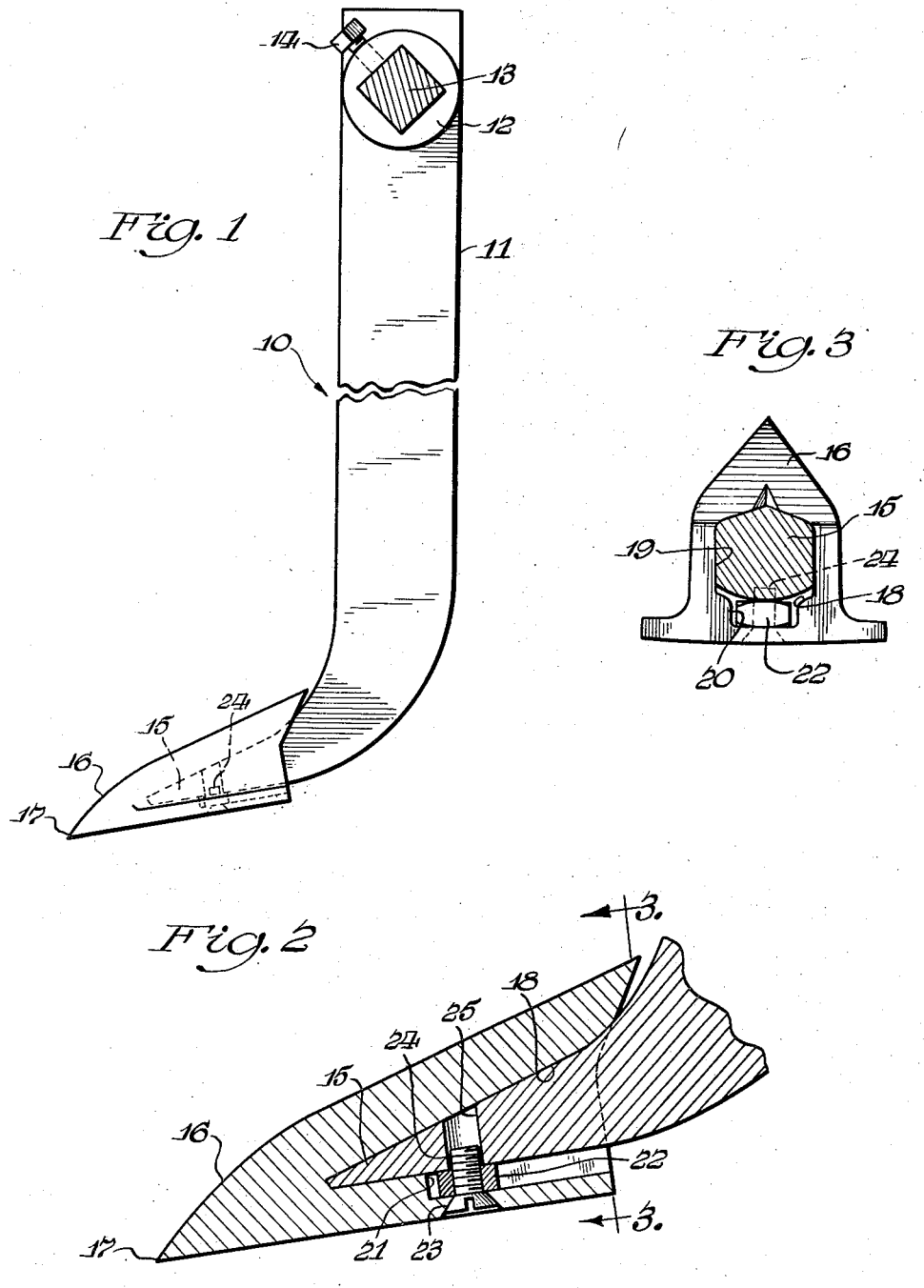

2,895,559

REPLACEABLE CULTIVATOR POINT

Wayne G. Toland, Stockton, Calif., assignor to International Harvester Company, a corporation of New Jersey Application February 16, 1956, Serial No. 566,046

3 Claims. (Cl. 172—762)

This invention relates to agricultural implements and particularly to cultivators. More specifically the invention concerns a cultivator shovel or earth-penetrating point which can be replaced quickly and easily when it becomes worn or damaged.

Earth working tools or shovels are usually secured to their supporting shanks by means such as threaded bolts and screws which become rusted and jammed during operation so that removal and replacement is a tedious and sometimes impossible procedure frequently requiring costly replacement of the entire tool and shank assembly. Therefore, the present invention contemplates as its principal object, the provision of an improved tool and supporting shank assembly in which replacement of worn and damaged earth-penetrating points is made relatively easy and involves substantially no damage to the shank.

Another object of the invention is the provision of a simple and economical and yet sturdy cultivator shovel and shank construction wherein the shovel is held firmly on the shank during operation but may be removed simply by a sharp blow of a hammer.

Other objects and advantages of the invention will become clear from the following detailed description when read in conjunction with the accompanying drawings, wherein:

Figure 1 is a view in side elevation, partly in section, showing the earth-penetrating tool and shank assembly of this invention with the shank mounted upon a square tool bar;

Figure 2 is an enlarged longitudinal sectional detail of a portion of the structure shown in Figure 1; and Figure 3 is a section taken on the line 3—3 of Figure 2.

Referring to the drawings, the numeral 10 designates a tool shank having an upright or vertical portion 11 including a bearing portion 12 slidably receiving a square tool bar 13, which may be part of a cultivator frame carrying a plurality of such cultivator shanks 10. The shank 10 is held in place on the bar 13 by a set-screw 14.

The shank 10 is provided with a foot 15 which is bent outwardly and is tapered as indicated in Figures 1 and 2.

The foot 15 is adapted to slidably receive an earth-working tool in the form of a diamond point shovel 16 having a forward earth-penetrating edge 17 and a rearwardly entrant socket 18 extending longitudinally into the body of the shovel 16 and including a large opening 19 shaped to fit and slidably receive the foot 15 and having a lower restricted portion 20 generally rectangular and channel-shaped and forming a groove which terminates in a shoulder 21.

The channel-shaped space or groove 20 is adapted to slidably receive a spacer in the form of a threaded nut 22, the diameter of which approximates the diameter of the channel-shaped space 20 to prevent its rotation therein.

In assembling the shovel 16 on the foot 15, the latter is inserted in the socket 18 and nut 22 inserted in the space 20 between the lower face of the foot 15 and the bottom of the groove 20, until it aligns with a countersunk opening 23 in the base of the shovel adapted to receive a stove bolt 24 for threading into the nut 22.

When the foot 15 is fully received in the shovel 16, the opening 23 likewise aligns with a recess or opening 25 in foot 15. The shank of the bolt 24 is sufficiently long that after threading in the nut 22 it is slidably received and projects upwardly into the recess 25. The bolt 24 is held securely by nut 22 and the shovel cannot be displaced from the foot 15 of the shank because of the frictional engagement of the bolt 24 with the walls of the recess 25.

When it is desired to remove and repair or replace the shovel 16 it is merely necessary to strike the shovel a sharp blow with a hammer against the rear edge thereof to shear off the projecting end of the bolt 24. Since the bolt is not threaded into the opening 25, the sheared end thereof merely drops out or is easily removed.

It should be clear from the foregoing description that a novel earth-working shovel and supporting shank assembly has been provided which reduces the cost and labor involved in the repair and replacement of shovels to a minimum. The invention has been described in its preferred embodiment, and it should be understood that modifications may be made therein without departing from the spirit of the invention or the scope of the appended claims.

What is claimed is:

1. The combination with a tool shank having a tool-receiving portion, of a replaceable tool having an earth-penetrating forward end and a socket therein opening to the rear and conforming generally to the shape and size of said tool-receiving portion to slidably receive the latter, said socket having a restricted portion forming a generally channel-shaped groove lengthwise thereof between the bottom of said tool-receiving portion and the bottom of the socket and opening at the rear of the tool, said tool-receiving portion having a smooth bore cylindrical recess therein, a threaded member carried by the tool and slidably receivable in said recess to prevent displacement of the tool from said tool-receiving portion, and a locking member slidable in said groove to a position in registry with said threaded member, said locking member comforming generally to the sape of said groove to prevent rotation of the locking member therein and having means cooperable with said threaded member for securing the latter to the tool.

2. The combination with a tool shank having a tool-receiving portion, of a replaceable cultivator tool having an earth-penetrating forward end and a socket therein opening to the rear and conforming generally to the shape and size of said tool-receiving portion to slidably receive the latter, said socket having a restricted portion forming a groove lengthwise thereof between the bottom of said tool-receiving portion and the bottom of the socket and opening to the rear of the tool, said tool-receiving portion having a smooth bore cylindrical recess therein and said tool having an opening therein communicating with said groove and said recess, means serving as a spacer slidably receivable in said groove and slidable to a position in registry with said opening and said recess, and a retainer slidably receivable in said opening and said recess and having frictional engagement with said spacer to secure the retainer to the tool.

3. The combination with a tool shank having a foot portion, of a replaceable cultivator shovel having an earth-penetrating forward end and a socket therein opening to the rear to slidably receive said foot portion, said socket having a main portion substantially the shape and size of said foot portion and a restricted portion forming a groove channel-shaped in section between said foot portion and the body of the shovel, said shovel having an opening therein communicating with said restricted portion and said foot portion having a smooth bore cylindrical recess therein registrable with said opening in the shovel, a threaded spacer conforming to the shape and size of said groove to prevent rotation of the spacer therein and slidably receivable in said groove and slidable to a location in registry with said opening and said recess, and a screw threaded for cooperation with said spacer and slidably receivable in said opening and said recess for securing the shovel to the shank.

References Cited in the file of this patent

UNITED STATES PATENTS

| | | |
|---|---|---|
| 254,556 | Knowlton | Mar. 7, 1882 |
| 430,166 | Bauman | June 17, 1890 |
| 622,105 | Bernard et al. | Mar. 28, 1899 |
| 1,108,600 | McCulley et al. | Aug. 25, 1914 |
| 1,297,610 | Tschudin | Mar. 18, 1919 |
| 1,481,458 | Cullen | Jan. 22, 1924 |
| 1,807,998 | McCord | June 2, 1931 |

FOREIGN PATENTS

| | | |
|---|---|---|
| 75,522 | Denmark | Feb. 16, 1953 |